(12) United States Patent
Mahajan et al.

(10) Patent No.: US 8,433,812 B2
(45) Date of Patent: Apr. 30, 2013

(54) SYSTEMS AND METHODS FOR MANAGING MULTIMEDIA OPERATIONS IN REMOTE SESSIONS

(75) Inventors: Rajneesh Mahajan, Bellevue, WA (US); Vladimir Stoyanov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/060,620

(22) Filed: Apr. 1, 2008

(65) Prior Publication Data

US 2009/0248802 A1 Oct. 1, 2009

(51) Int. Cl.
*G06F 15/16* (2006.01)
*G06Q 10/00* (2006.01)

(52) U.S. Cl.
USPC ............. 709/231; 709/246; 709/229; 705/1.1

(58) Field of Classification Search .................. 709/231, 709/246, 203, 229; 705/30, 1.1
See application file for complete search history.

(56) References Cited

U.S. PATENT DOCUMENTS

| | | | |
|---|---|---|---|
| 5,452,435 A | 9/1995 | Malouf et al. | |
| 5,831,609 A | 11/1998 | London | |
| RE37,418 E | 10/2001 | Tindell et al. | |
| 6,354,748 B1 | 3/2002 | Vrvilo | |
| 6,401,124 B1* | 6/2002 | Yang et al. | 709/228 |
| 6,412,031 B1 | 6/2002 | Grooters | |
| 6,466,939 B1 | 10/2002 | Lai et al. | |
| 6,615,199 B1 | 9/2003 | Bowman-Amuah | |
| 6,701,383 B1* | 3/2004 | Wason et al. | 719/328 |
| 6,738,356 B1 | 5/2004 | Russell | |
| 6,909,878 B2* | 6/2005 | Haller et al. | 455/41.3 |
| 7,116,894 B1* | 10/2006 | Chatterton | 386/211 |
| 7,178,106 B2* | 2/2007 | Lamkin et al. | 715/716 |
| 7,617,523 B2* | 11/2009 | Das et al. | 726/5 |
| 8,060,631 B2* | 11/2011 | Collart et al. | 709/229 |
| 2002/0129359 A1* | 9/2002 | Lichner | 725/5 |
| 2003/0123846 A1* | 7/2003 | Hamada et al. | 386/46 |
| 2003/0182469 A1* | 9/2003 | Lok et al. | 709/328 |
| 2004/0010560 A1* | 1/2004 | Sandage et al. | 709/208 |
| 2004/0210450 A1* | 10/2004 | Atencio et al. | 705/1 |
| 2005/0021590 A1* | 1/2005 | Debique et al. | 709/200 |
| 2005/0091597 A1* | 4/2005 | Ackley | 715/716 |

(Continued)

FOREIGN PATENT DOCUMENTS

| | | |
|---|---|---|
| CN | 101124825 | 2/2008 |
| WO | WO2008018860 | 2/2008 |

OTHER PUBLICATIONS

Cesar, "A Graphics Software Architecture for High-End Interactive TV Terminals", at <<http://lib.tkk.fi/Diss/2005/isbn951227888X/isbn951227838X.pdf>>, Helsinki University of Technology, 2005, pp. 135.

(Continued)

*Primary Examiner* — Firmin Backer
*Assistant Examiner* — Michael A Chambers
(74) *Attorney, Agent, or Firm* — Lee & Hayes, PLLC

(57) ABSTRACT

Techniques relating to managing multimedia transmissions in terminal services scenarios are described. In an example, a method sends a user-interface component from a server to a remote client. The exemplary method further streams a media component for presentation on the remote client in combination with the user-interface component and the media presentation is tracked but not displayed by the server.

19 Claims, 6 Drawing Sheets

U.S. PATENT DOCUMENTS

| | | | |
|---|---|---|---|
| 2005/0273496 A1* | 12/2005 | Jean et al. | 709/206 |
| 2006/0069797 A1* | 3/2006 | Abdo et al. | 709/231 |
| 2006/0152575 A1 | 7/2006 | Amiel et al. | |
| 2006/0282855 A1* | 12/2006 | Margulis | 725/43 |
| 2007/0074258 A1* | 3/2007 | Wood et al. | 725/105 |
| 2007/0118642 A1 | 5/2007 | Kumbalimutt | |
| 2007/0124737 A1 | 5/2007 | Wensley et al. | |
| 2007/0174487 A1* | 7/2007 | Busey | 709/246 |
| 2007/0271338 A1 | 11/2007 | Anschutz | |
| 2009/0077041 A1* | 3/2009 | Eyal et al. | 707/3 |
| 2012/0030366 A1* | 2/2012 | Collart et al. | 709/229 |

OTHER PUBLICATIONS

"Evolution of a Cross-Platform, Multimedia Courseware Presentation System", available at least as early as Sep. 3, 2007, at <<http://ripples.cs.umass.edu/about/pubs/2006ToITsubmission.pdf>>, pp. 30.

Monroe, et al., "The QuickTime Media Layer", at <<http://www.mactech.com/articles/mactech/Vol.13/13.07/QuickTimeMediaLayer/index.html>>, Apple Computer, Inc., vol. 13, No. 7, pp. 5.

Chinese Office Action mailed Apr. 11, 2012 for Chinese patent application No. 200980112501.6, a counterpart foreign application of U.S. Appl. No. 12/060,620, 10 pages.

Mexican Office Action mailed Oct. 19, 2011 for Mexican patent application No. MXa2010010520, a counterpart foreign application of U.S. Appl. No. 12/060,620, 2 pages.

"Computers in Translation: A Practical Appraisal", John Newton (Editor), Aug. 27, 1992, Routledge, London, pp. 81-82.

Extended European Search Report mailed Jul. 23, 2012 for European patent application No. 09767129.1, 12 pages.

Lu, et al., "A Generic Application Sharing Architecture Based on Message-Oriented Middleware Platform", Computer Standards and Interfaces, Elsevier Sequoia, Lausanne, CH, vol. 30, No. 3, Jan. 5, 2008, pp. 191-199.

"Media Foundation", Wikipedia, Mar. 1, 2008, retrieved from the internet on Jul. 12, 2012 at http://en.wikipedia.org/w/index/php?title=Media_Foundation&oldid=178111759, 6 pgs.

Chinese Office Action mailed Decmeber 18, 2012 for Chinese patent application No. 200980112501.6, a counterpart foreign application of U.S. Appl. No. 12/060,620, 13 pages.

Russian Office Action mailed Dec. 20, 2012 for Russian patent application No. 2010140138, a counterpart foreign application of U.S. Appl. No. 12/060,620, 4 pages.

* cited by examiner

SYSTEMS AND METHODS FOR MANAGING MULTIMEDIA OPERATIONS IN REMOTE SESSIONS

BACKGROUND

Remote session, which can include collaboration sessions can provide for a remoting experience between a local computer and a remote computer. Collaboration can involve recreating an appearance of a portion, or all, of the local computer's graphical user-interface on the remote computer. The graphical user-interface can be recreated on the remote computer using one or more techniques, such as remoting. The collaboration sessions that are finally recreated on the remote computer can be governed by one or more parameters that may be associated with the portion of the local computer, being recreated at the remote computer.

A common example of a collaboration session can be operations relating to media operations for playing back multimedia files. Techniques for remoting such sessions may involve transferring media data from the local computer to the remote computer. The media data may include data associated with the multimedia files that are intended to be played, processing data, rendering data, and so on. The multimedia files on the local computer, can be remotely played back on the remote computer by remoting media data to the remote computer. The media data, instead of being rendered onto the local computer, is rendered onto the remote computer.

SUMMARY

This summary is provided to introduce concepts for managing multimedia operation in remote sessions. These concepts are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

Figure 1:
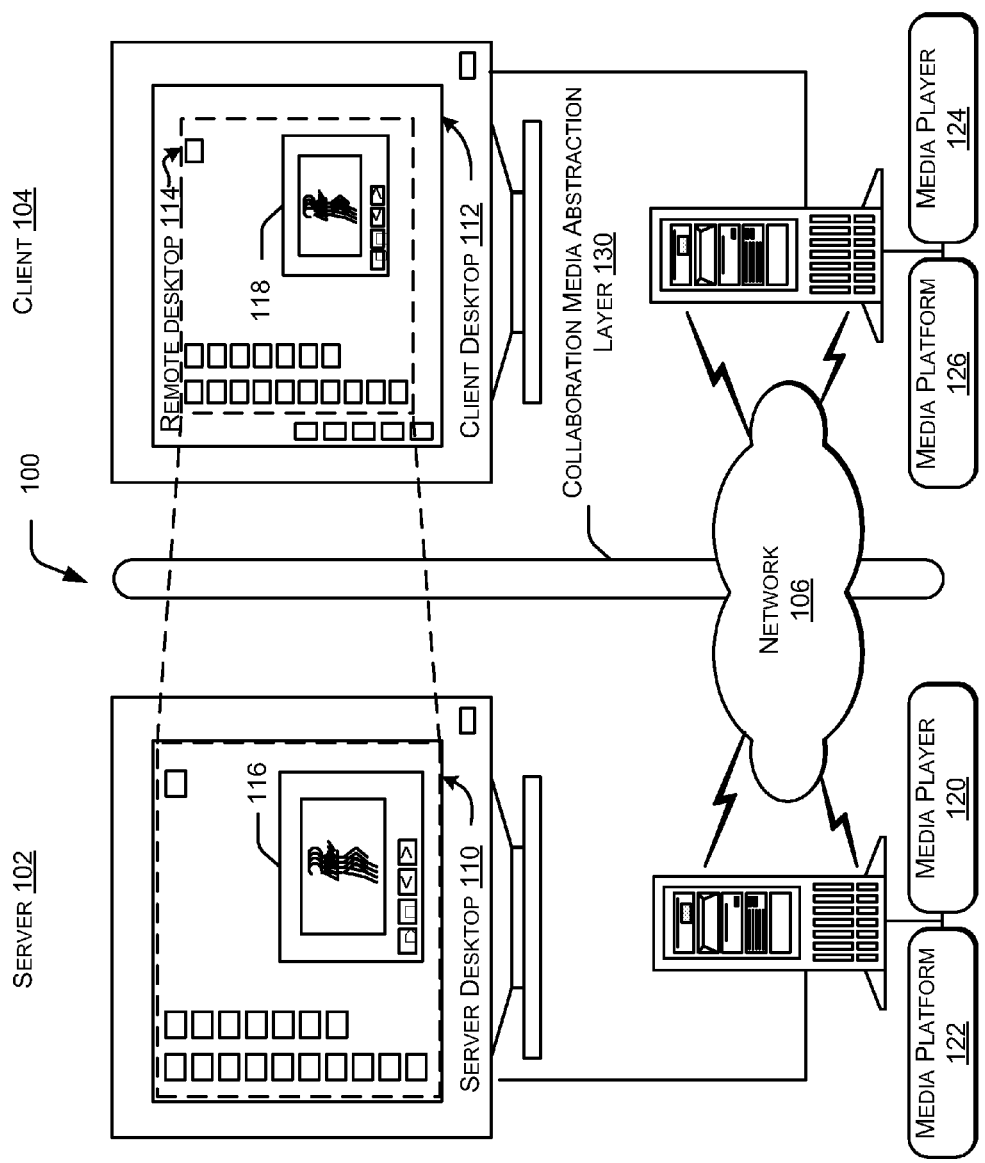
FIG. 1 is a block diagram illustrating an exemplary network for managing multimedia operations in a collaborative session.

The methods and systems described below relate to collaboration sessions and handling media playback operations in collaboration sessions. Collaboration sessions can provide a remoting experience between a client computer (hereinafter, "client") and a server computer (hereinafter, "server"). Collaboration can involve representing a portion, or all, of the server's graphical user-interface (GUI) on the client. In some collaboration scenarios, media operations, such as media playback commands, can be handled separately from the remainder of the GUI for various reasons. For instance, media playback commands can be handled separately to conserve network bandwidth between the server and the client. In such cases, media can be redirected from the server to the client in an unprocessed or partially processed form. The client can then process the media and integrate the processed media with a remainder of the GUI to create a representation of the server GUI.

Media or media files can be stored according to different formats such as formats in conformance with MPEG, etc. among others. Processing the media files can be accomplished by a media player that employs one or more media platforms configured to handle the format of the media file. Media processing can involve media operations such as media playback commands. Such media operations can be platform specific. In a collaboration scenario, the client and server may or may not support the same media platforms. For example, media playback commands specific to a media platform supported on a server may be meaningless for a media platform supported on the client.

The exemplary implementations can provide an abstraction functionality allowing media operations to be effectively conveyed in a collaboration session between server and client. For example, abstraction of the media operations can facilitate execution of a user's media playback command in a collaboration session. In such cases, some implementations can translate a platform specific media playback command of the server into a generic media playback command. The generic media playback command can then be translated into a platform specific media playback command for a media platform supported on the client. The client can then execute the media playback command and integrate the results with the remainder of the GUI of the client.

In an implementation, the media is sent to the client for processing rather than being processed on the server, the platform specific commands can be intercepted at the server. As discussed, the server and the client may or may not have the same platforms. Accordingly, the server's platform specific commands may be not understood on the client. The present implementations can facilitate effective communication between the server and client such that the user's media playback commands are executable on the client independent of platforms employed on the server and client. For example, some of the present implementations can translate the server's platform specific commands into generic media playback commands. The generic media playback commands can then be sent to the client. The client can convert the generic commands into commands that are specific to a platform supported by the client. The client's platform can then process the commands to achieve the desired effect (i.e., play, pause, stop, etc.) on the client device.

Exemplary Systems

FIG. 1 illustrates an exemplary system 100 for implementing collaboration sessions and to handle media operations in those collaboration sessions. The system 100 can include a server 102 coupled to a client 104 via a network 106. A server desktop 110 can be displayed on server 102. Similarly, a client desktop 112 can be displayed on client 104.

The implementations described are in the context of a computing environment as commonly encountered at the present point in time. Various examples can be implemented by computer-executable instructions or code means, such as program modules, that are executed by a computer, such as a personal computer or PC. Generally, program modules include routines, programs, objects, components, data structures, and the like, that perform particular tasks or implement particular abstract data types.

Various examples may be implemented in computer system configurations other than a PC. For example, various embodiments may be realized in hand-held devices, multi-processor systems, microprocessor-based or programmable consumer electronics, network PCs, minicomputers, mainframe computers, cell phones and the like. Further, as technology continues to evolve, various implementations may be realized on yet to be identified classes of devices. For example, as the cost of a unit of processing power continues to drop and wireless technologies expand, computing devices resembling today's cell phones may perform the functionalities of today's PC, video camera, cell phone, and more in a single mobile device. This single device may in one scenario act as a server and in another scenario act as a client. This is but one of many existing and developing examples for the described implementations.

Various examples may be practiced in distributed computing environments, where tasks are performed by remote processing devices that are linked through a communications network. In a distributed computing environment, program modules may be located in both local and remote memory storage devices. Further, the terms server and client as used herein do not connote any relative capabilities of the two devices. The client may have more, less, or equal processing capabilities than the server. Rather, in this description, the names server and client describes the relative relationship of the two components. For example, a computing environment of a first or server device is remoted to a second or client device. For ease of explanation the examples provided in this document relate to a single server and a single client; however, this is but one potential configuration. It is to be appreciated that in other implementations may include one or more servers supporting multiple clients. In some implementations a first computer may act as a server for a second computer, which acts as a server for a third computer.

As discussed, collaboration sessions can provide for a remoting experience between server 102 and client 104. Collaboration can involve representing a portion, or all, of the server's graphical user-interface (GUI) on the client. In this case, the GUI is represented as server desktop 110. In particular, collaboration can create the impression that one or more applications that are running on the server 102 are actually running on the client 104.

Examples of collaboration sessions can include remote terminal session scenarios and one or more presentation scenarios, among others. In a remote terminal session scenario, the GUI from the server's display area (e.g., server desktop 110) can be generated on the client 104 as representation or remote desktop 114. A presentation scenario can involve remoting a GUI of a particular application running on the server rather than the whole desktop 110. In such a scenario, the server's GUI (e.g., a graphical window) of the application can be utilized for generating a representation of the application on the client. For example, server desktop 110 includes a media player graphical window 116. A presentation session can generate a representation 118 on the client 104 of graphical window 116 without the remainder of the server's desktop 110. Media processing can be accomplished on the server 102 by a media player 120 via a media platform 122, stored on the server 102. Similarly, media processing can be accomplished on the client 104 by a media player 124 via a media platform 126, stored on the client 104.

As discussed, most of the processes corresponding to the collaboration session can occur on the server 102; however, in the collaboration session, media operation can be, at least partially, processed on the client 104. For example, media playback commands can represent one or more types of media operations. Media playback commands generated by the user (i.e., user-commands) at the client 104 can be forwarded to the server 102 for processing. The server 102 processes user-commands according to the configuration of the server 102. For example, the server 102 processes the user-commands based on the media platform 122. In such a case, the processing of the user-commands can generate specific media playback commands based upon the user-commands that are specific to the media platform 122.

The collaboration session can intercept the platform specific media playback commands and can send the commands to the client for execution. In certain cases, the client's media platform 126, may not understand the media playback commands specific to the server's media platform 122. To this end, the system 100 can include a collaboration media abstraction layer 130 that can facilitate media-related communications between the server 102 and client 104. For example, in the present example the collaboration media abstraction layer 130 can abstract or genericize the media playback commands specific to media platform 122. The genericized media playback commands can then be translated into media playback commands specific to the client's media platform 126.

Accordingly, the collaboration media abstraction layer 130 can facilitate execution of user-commands in a collaboration session. Furthermore, beyond the media playback command example, the collaboration media abstraction layer 130 can facilitate communicating media operations between the server 102 and the client 104 in a collaboration session.

In certain cases, the generic media playback commands can be understood by the client 104 regardless of configuration differences of the server 102 and the client 104. For instance, the client 104 and the server 102 may have different operating systems, different versions of the same operating system, or different media platforms, among others. The working of the system implementing managing multimedia operations in a collaborative session is further described in detail in conjunction with FIG. 2 and FIG. 3.

Figure 2:
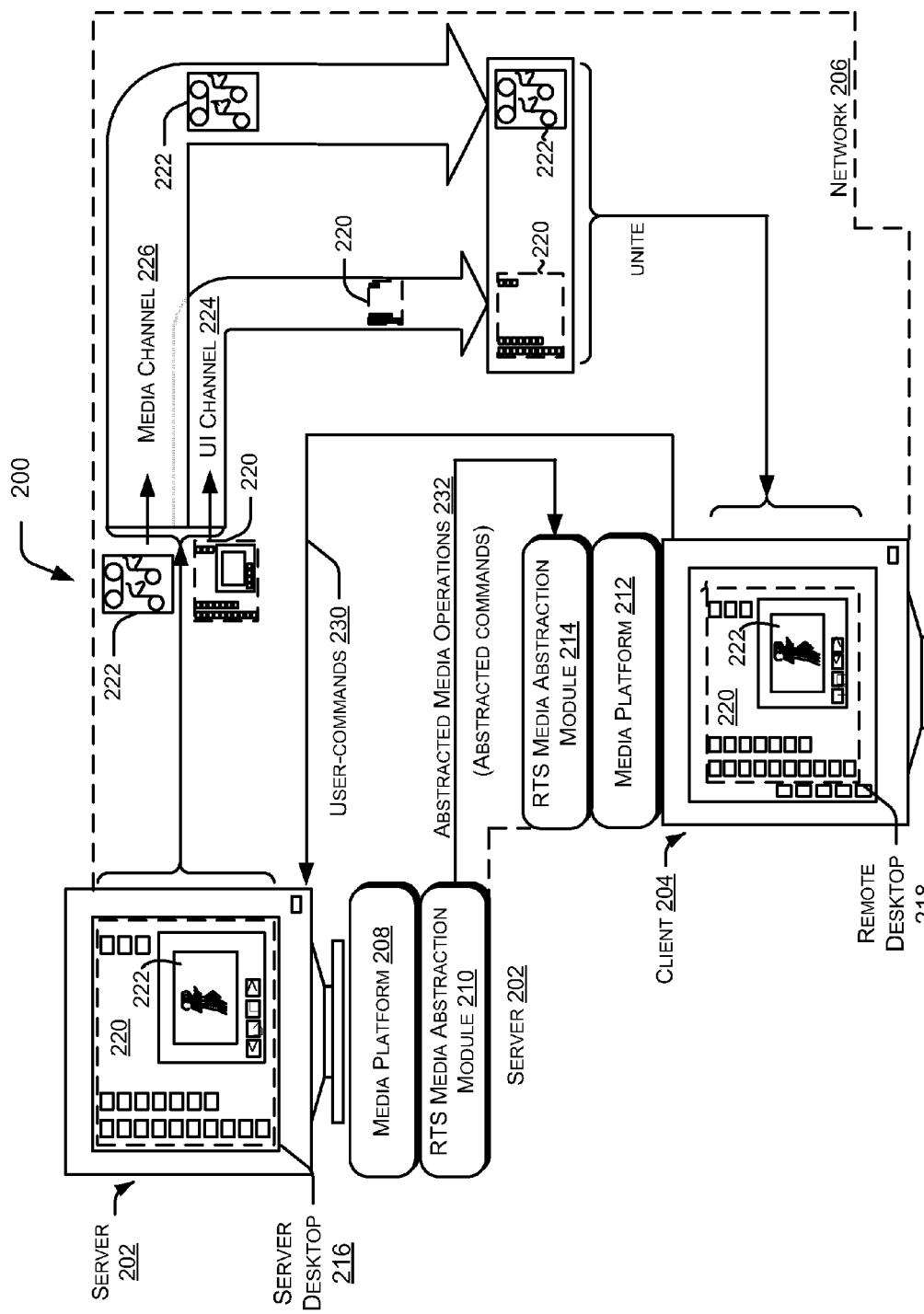
FIG. 2 is a flow diagram illustrating the managing multimedia operations in a collaborative session in a computer based network.

FIG. 2 shows a system 200 that builds upon the concepts introduced in relation to FIG. 1. In this case, the system 200 is described in relation to a remote terminal session. It is to be appreciated that similar concepts could be equally applicable to other collaboration sessions. In the present implementation, the system 200 includes a server 202 and a client 204 that can communicate over a network 206. The server 202 includes a media platform 208 and a remote terminal session or "RTS" media abstraction module 210. The client 204 includes a media platform 212 and a RTS media abstraction module 214.

In this implementation, the server 202 can send data relating to server's desktop 216 to the client 204 for generating a remote representation, such as remote desktop 218, at the client 204. Data associated with the remote desktop 218 can include a user-interface component 220 and a media component 222.

User-interface-component 220 can include graphics and images that typically compose a user-interface. User-interface component 220 can include icons, host audio, background images and applications representations such as the GUI associated with word-processing applications, spreadsheet applications, database applications, media applications, etc. Virtually any components that are not media component 222 are part of user-interface component 220. When compared to the media component 222, the user-interface component 220 can be relatively static and relatively low data intensive. In contrast, the media component 222 may be relatively dynamic and highly data intensive.

As discussed, media component 222 can be highly data intensive as they include media-rich elements that compose a media presentation or media event. Transmission of data associated with the media component 222 can be bandwidth-intensive. Examples of media component 222 include, but are not limited to, streaming media presentations including a video and/or audio presentation, television broadcasts, such as a cable television (CATV), satellite, pay-per-view, or broadcast program; digitally compressed media experiences; radio programs; recorded media events (e.g., sourced by a VCR, DVD player, CD player, Personal Video Recorder and the like); real-time media events; and camera feeds, among others.

For purposes of explanation, media component 222 is illustrated both on the server desktop 216 and on the client's remote desktop 218. It is to be appreciated that portions or the whole of the server desktop 216 may not necessarily be displayed on the display device of the server 202. In such implementations, the media component 222 (or a portion thereof) may only appear on the client. For instance, the server desktop can be remoted to the client even if the server is not connected to a display device.

The data for the remote desktop 218 can be sent from server 202 to client 204 over network 206. In an implementation, data associated with the user-interface component 220 and the media component 222 can be transmitted over user-interface channel 224 and media channel 226 respectively.

User-interface channel 224 can communicate user-interface component 220 to client 204. In an implementation, Terminal Server and Terminal Client Services, offered by the Microsoft® Corporation of Redmond, Wash., can provide an exemplary user-interface channel 224. A remotable protocol can be used to transmit data through user-interface channel 224. Exemplary protocols and data formats include, remote desktop protocols (RDP), the T-120 series protocol or HTML (hypertext markup language and its many variations), among others. Independent Computing Architecture (ICA) developed by Citrix® Systems offers another example that can support remote terminal session.

The media channel 226 can be separate from, or integrated with, user-interface channel 224. The media channel 226 can be used to transmit bandwidth-intensive experiences such as video and other media types as listed above. In this instance, the media channel 226 can provide a communication conduit for media component 222 to flow separately from user-interface component 220. Therefore, the media component 222 can be sent out of band with respect to the user-interface component, but synchronized. An exemplary protocol to transmit data through media component 226 can include, but is not limited to, Transmission Control Protocol (TCP), and a virtual channel over an RDP connection.

In other words, the present implementations can bifurcate data delivery relating to the remote desktop. Relatively low data-intensive components of the server desktop 216, such as user-interface component 220, can be processed on the server 202 and then transmitted to the client 204. Relatively highly data-intensive components, such as media component 222, can be transmitted to the client 204 in an unprocessed or a less processed form. The processing can then be completed by the client 204, and combined with the low data intensive components to create the remote desktop 218 at the client 204. Events (i.e., media operations) which affect the media presentation can be tracked at the server so that a relative relationship of the media presentation to other portions of the remote desktop 218 can be maintained.

In the present exemplary scenario, the user-interface component 220 is combined or united with the media component 222 to generate the remote desktop 218 at the client 204. A user at client 204 can remotely operate server 202 by interacting with remote desktop 218. For instance, the user at client 204 can move a mouse cursor over an application on the remote desktop 218 and open an application by clicking on a corresponding icon. Likewise, the user can issue commands to an application through the remote desktop. For example, in relation to a media application, the user may utilize mouse clicks to issue user-commands such as start playback (start), stop playback (stop), fast forward, rewind, pause, and set volume, among others. The present implementations facilitate execution of the user-commands in the remote terminal session scenario.

For purposes of explanation consider a hypothetical scenario where a user at the client 204 enters user media playback commands (user-commands) relating to the remote desktop 218. The user-commands can be relayed from the client 204 to the server 202 as part of the remote terminal session via network 206 as indicated generally as commands 230. The commands 230 can be sent over the UI channel 224 or over a different channel. The commands 230 can be processed on the server 202 by media platform 208 into platform specific media commands. As discussed, the media processing of media platform 208 can be intercepted as part of the remote terminal session and sent to the client 204 for further processing.

The client's media platform 212 may or may not be the same as the server's media platform, such as media platform 208, and as such may or may not understand the intercepted platform-specific media commands of the server 202. The server's RTS abstraction module 210 can receive the intercepted platform specific media commands. The RTS abstraction module 210 can translate the intercepted platform specific media commands into generic or abstracted media commands. The generic media commands can be sent from the server's RTS media abstraction module 210 to the client's RTS media abstraction module 214 as indicated generally as commands 232. The client's RTS media abstraction module 214 can translate the generic media commands, such as commands 232, into media commands that are specific to the client's media platform 212. The client's media platform 212 can then execute the client specific media commands to accomplish the user-command. A more detailed example for accomplishing the media command abstraction in a remote terminal session is described below in relation to FIG. 3.

Figure 3:
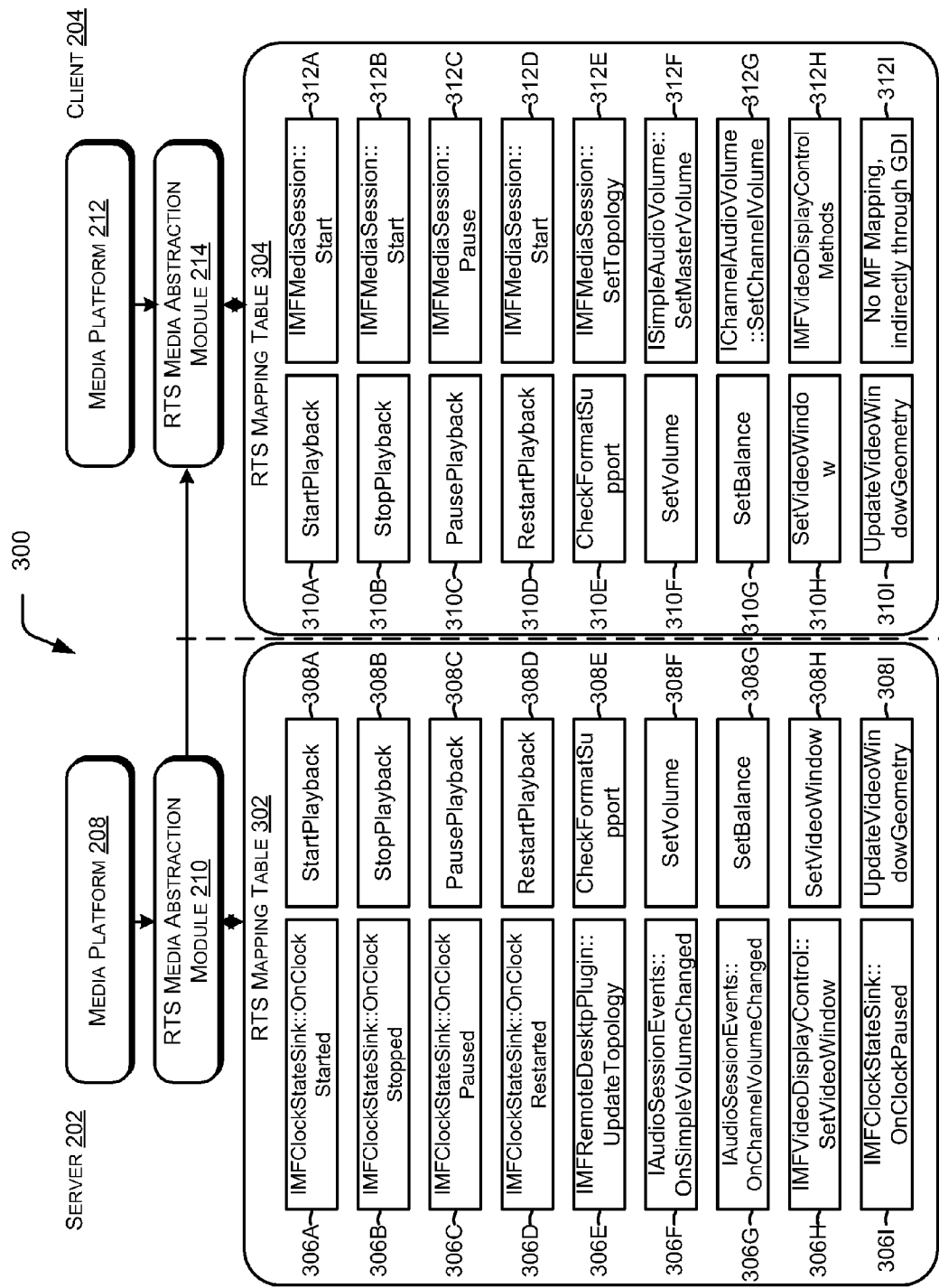
FIG. 3 is an exemplary illustration of mapping tables for managing multimedia operations in a collaborative session.

FIG. 3 provides an example of how the system 200 can accomplish the media operation abstraction described above in relation to FIG. 2. In this case, RTS media abstraction modules 210, 214 at the server 202 and the client 204 respectively, accomplish the media operation abstraction by means of remote terminal session (RTS) mapping tables 302, 304. For example, the server's RTS media abstraction module 210 can receive media commands that are specific to the server's media platform 208. In an implementation, the commands received by the server's RTS media abstraction module 210 can be in response to one or more actions that may be specific to events associated with the playback of media files. For example, the server's RTS media abstraction module 210 can receive commands when a media file is accessed for playback by one or more users at the client 204.

The server's RTS media abstraction module 210 can utilize RTS mapping table 302 to map the received media operations into generic or abstract media operations. The abstracted media operations from RTS mapping table 302 can be sent to the client's RTS media abstraction module 214. The client's RTS media abstraction module 214 can employ another RTS mapping table 304. The RTS mapping table 304 can translate the abstracted media operations into media operations that are specific to the client's media platform 212. The client's media platform 212 can then execute the media operations.

For purposes of explanation, assume that the server's media platform 208 is a Media Foundation® platform, while the client's media platform 212 is a DShow® platform. In this example, RTS mapping table 302 can translate Media Foundation® platform specific operations designated generally at 306A-306I into corresponding generic media operations designated generally at 308A-308I, respectively. Similarly, RTS mapping table 304 can translate generic media operations designated generally at 310A-310I into corresponding DShow® platform specific operations designated generally at 312A-312I. For instance, assume that RTS media abstraction module 210 based on a Media Foundation platform, receives an operation 306A, namely "IMFClockStateSink::OnClockStarted" from the media platform 208. The RTS media abstraction module 210 can utilize the mapping table 302 to translate the operation 306A into generic media operation command 308A, namely "StartPlayback". The RTS media abstraction module 210 can send the generic media operation command "StartPlayback" 308A to RTS Media abstraction module 214 on the client 204.

The generic media operation command, such as generic command 308A can be mapped onto a corresponding command of the client's media platform 212 based on the RTS mapping table 304. For instance, the RTS media abstraction module 214 can locate the generic media operation command "StartPlayback" received from the server 202 in the RTS mapping table 304. In this case, the generic media operation command "StartPlayback" is designated as 310A. The RTS mapping table 304 can translate the generic media operation command "StartPlayback" 310 into a DShow® platform specific media operation "IMediaControl::Run" designated as command 312A. The RTS media abstraction module 214 can send the DShow® platform specific media operation "IMFMediaSession::Start" 312A to the client platform 212, which is a DShow® platform, allowing the client's platform 212 to understand and execute the DShow specific media operation. Other mappings can be made by moving horizontally across an individual row of the mapping tables 302, 304. It is to be appreciated that the RTS mapping table 302, 304 at the server 202 and the client 204 respectively, can include other commands and mappings associating platform specific commands to generic commands and vice versa.

In an implementation, the RTS mapping tables 302, 304 can be configured to translate between yet to be developed media platforms. While the RTS mapping tables 302, 304 illustrated herein include a translation between two specific media platforms, other mapping tables can include multiple translations. For example, the server's media platforms 208 might be DShow and Media Foundation, while the client's media platforms might be a Quick Time® platform and an Ogg® platform. Accordingly, in some implementations, the RTS mapping tables 302, 304 can provide translations between a server media platform and a client media platform.

Furthermore, by abstracting the media operations, the RTS mapping tables 302, 304 can be simpler than other potential solutions. For example, the server RTS mapping table 302 may not need to take into account all the possible media platforms that can be employed on the client 204. In other words, the server's media table, such as RTS mapping table 302 can be independent of the client's media platform 212 (i.e., the server's media table does not need to be configured based upon the client's media platform configuration). The same can be said of the client's media table 212. Furthermore, the server's RTS mapping table 302 may not need to be updated as new media platforms are developed that could be employed on the client 204. Instead, the server RTS mapping table 302 can translate media operations, such as operations 306A-306I specific to whatever media platform(s) exists on the server 202 to the corresponding abstract or generic media operations, such 308A-308I. The client RTS mapping table 304 can then translate the generic media operations, such as 308A-308 to media operations, such as operations 310A-310I specific to the media platform(s) 212 on the client 204. The client RTS mapping table 304 does not need to take into account all the different media platforms that are or may be employed on the server 202. Instead, the client RTS mapping table 304 can simply translate from generic media operations 310A-310I to media operations specific to the media platform(s) 212 operating on the client 204.

The RTS mapping tables 302, 304 as illustrated represent but one possible implementation that can be accomplished utilizing a word processing document.

Figure 4:
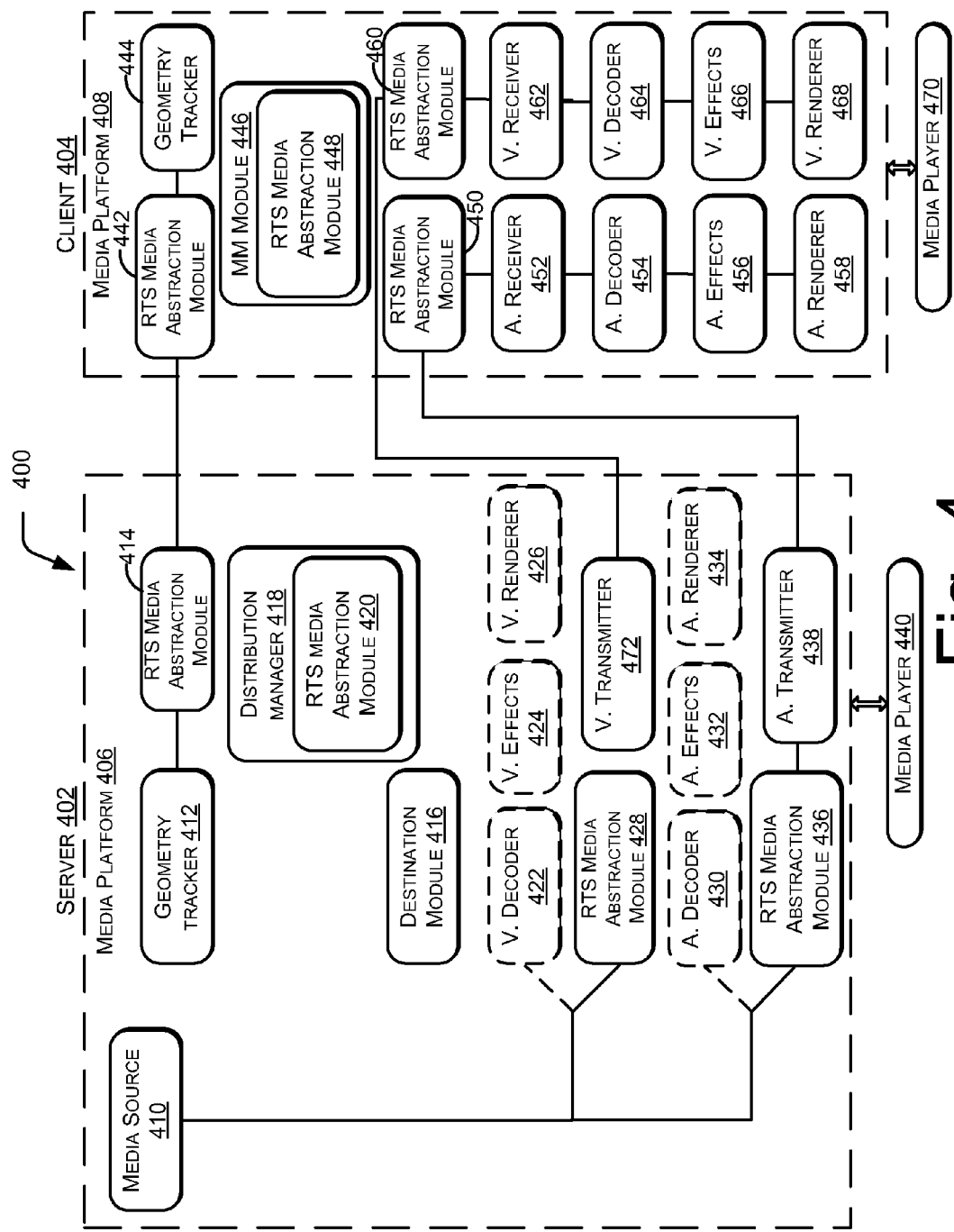
FIG. 4 is a block diagram illustrating one or more exemplary components of a media platform.

FIG. 4 is an exemplary representation of selective components of system 400 for supporting media operation abstraction in a remote terminal session. FIG. 4 relates to a media component of a remote terminal session between a server 402 and a client 404. In this implementation, the terminal services session entails a remote desktop protocol (RDP) configuration, examples of which are illustrated above. The system 400 can alternatively or additionally be utilized for other collaboration scenarios beyond remote terminal sessions.

Server 400 can include a first media platform 406 and a second media player 408. Media platform 406 is associated with a media source 410. The media platform 406 includes a geometry tracker module 412, an RTS media abstraction module 414, a destination module 416, and a distribution manager module 418 that includes an RTS media abstraction module 420. Media platform 406 also includes a video decoder 422, a video effects module 424, a video renderer 426, an RTS media abstraction module 428, an audio decoder 430, an audio effects module 432, an audio renderer 434, an RTS media abstraction module 436, and an audio transmitter 438. The server also includes a media player 440 that can communicate with the media platform 406.

The client's media platform 408 can include an RTS media abstraction module 442, a geometry tracking module 444, and a multimedia module 446 that includes an RTS media abstraction module 448. The client's media platform 408 can also include an RTS media abstraction module 450, an audio receiver module 452, an audio decoder 454, an audio effects module 456, and an audio renderer 458. Media platform 408 can further include an RTS media abstraction module 460, a video receiver 462, a video decoder 464, a video effects module 466, and a video renderer 468. The client also includes a media player 470 that can communicate with the media platform 408.

In this example, the server's media platform 406 can exist as part of a server operating system (not shown) to allow playback of media so that applications that interact with the operating system may control playback of media without "knowing" the particular details of formats of the media. Similarly, the client's media platform 408 can exist as part of a client operating system (not shown) to allow playback of media so that applications that interact with the operating system can control playback of media without a knowledge of the media. For instance, media platform 406 can allow an application, such as media player 440 to run without the media player 440 knowing the details regarding the formats of media being played back. In a similar fashion, the client's media platform 408 can allow media player 470 to run as part of a server operating system to allow playback of media so that applications that interact with the operating system may control playback of media without knowing the particular details of media formats. The media platform 406 running on the server 402 may be identical to the media platform 408 running on the client 404. In other instances the media platform 406 on the server 402 may be a different product and/or version than the media platform 408 operating on the client 404. The components described below can enable media operations to be effectively communicated between server and client in both the former and latter cases.

In this example, the server's media platform 406 can detect whether it is running in a remote terminal session via destination module 416. The destination module 416 can be an object that defines where a presentation is to be presented (e.g. a window, disk file, and the like) and what happens to the presentation. Further, the server media platform 406 can determine that the source is connected to a client, such as the client 404 that has the capabilities to render media locally. The distribution manager 418 can determine that the server's media platform 406 is connected to client 404, and that the client 404 has the capabilities to render the media locally. The distribution manager 418 can further establish remote terminal session policies to enable remoting the media to the client 404. The distribution manager 418 can establish a virtual channel connection with a multimedia client plug-in such as the multimedia component module 444 on the client 404. The virtual channel connection can allow for the exchange of control information relating to the remote terminal session between the server 402 and the client 404.

One aspect of the control information exchanged over the virtual channel connection between the distribution manager 418 and the multimedia component module 444 involves media operations in the remote terminal session. The distribution manager 418 and the multimedia component module 444 can employ their respective RTS media abstraction modules 420, 446 to negotiate how to handle media operations in the remote terminal session. Either of the server 402 and the client 404 can initiate negotiations over the media operations. In some implementations, the media operation negotiations can be initiated as part of the start-up procedures for establishing a remote terminal session. In other implementations the media operation negotiations may be started responsive to a media operation, such as a user's media playback command being received in a remote terminal session.

In an illustrative example, responsive to a user's media playback command, the server 402 may determine the media format of media from media source 410. Assume for purposes of this explanation that the server 402 determines the sources media format to be MPEG IV. The server's RTS media abstraction module 420 can query whether the client, such as the client 404, supports the MPEG IV media format. For example, the server's RTS media abstraction module 420 can query the client's RTS abstraction module 448 whether the client supports a particular media format, such as MPEG IV. An example of such a query is provided in RTS mapping tables 302, 304 as the generic media operation "check format support" evidenced at 308E and 310E. The client's RTS media abstraction module 448 can query back asking the server 402 what media platform can be utilized to support the media format. The client 404 can then utilize information from the server 402 to determine whether the client 404 supports the media format. Alternatively, the client 404 may determine that it has a media platform, such as media platform 408 that supports the media format. In the latter case, the client 404 can instruct the server 402 to proceed with streaming the media. For example, the client 404 through the client's RTS media abstraction module 448 may have a media platform 408 that differs completely in from the media platform 406 on the server 402. In such cases, before the operations, such as playback, pause, and so on, of the collaboration sessions proceed, a check can be performed for the platform being supported by the client 404. In another case, rather than waiting for the server, the client's RTS media abstraction module 448 can proactively inform the server 402 of the capabilities associated with the client 404 relating to the media formats supported by the client 404 and/or the media platforms operating on the client 404.

Furthermore, utilizing the virtual channel connection allows the distribution manager 418 and the multimedia component 446 to establish a distributed topology. The distributed topology can perform various functionalities. For example, the distributed topology can include a network transmitter at the server 402 and a network receiver at the client 404. The network receiver is connected in turn to audio and/or video renderers 458, 468 respectively at the client 404. In this particular configuration a video transmitter 472 and an audio transmitter 438 are illustrated on server 402 while a corresponding video receiver 462 and an audio receiver 452 are illustrated on the client 404.

During a remote desktop media presentation scenario, media can be directed to the client 404, in an unprocessed or partially processed form, as a stream. For example, at the server 402, the media platform 406 can intercept media that would otherwise be processed at the server 402, such as by the video decoder 422, the video effects module 424, the video renderer 438, the audio decoder 430, the audio effects 432 and the audio renderer 434. The media may be redirected to the respective video and audio transmitters 472, 438 for streaming to the client 404. Streaming may be over various channels. For example, the media may be streamed in band with the RDP over a virtual channel. Such a configuration re-uses the existing RDP connection and allows RDP to handle various details of punching thru firewalls, and establishing a secure, authenticated context, among other tasks. Alternatively or additionally, the media may be streamed over a side-band user datagram protocol (UDP) or transmission control protocol (TCP) connection. In certain implementations, an out of band configuration may be used. For example, in a particular configuration, an out of band connection may be available with greater bandwidth over that connection, than is available in the connection through RDP.

On the client 404, the streamed media is received at the multimedia module 446 which in turn passes the streamed media to video and audio receivers 462, 452 respectively. The video and audio receivers 462, 452 respectively pass the media to the client-side transforms and sinks, which include the video decoder 464, the video effect 466, the video renderer 468, the audio decoder 454, the audio effects 456 and the audio renderer 458. The media is then decoded and rendered at the client 404. Since the audio and video are streamed in encoded form, any synchronization tools contained in the encoded media may be available at the client 404 for maintaining proper audio video synchronization. For ease of explanation, unprocessed media is streamed from the server 402 to the client 404.

Some processing of the media may occur in other implementations. For example, assume that consistent with the above described remote desktop scenario, a user requests to play media which is encoded at the source in hypothetical codec AA. In this example, the source may contain the components to decode hypothetical codec AA, but the client may not; however, both the source and the client may have codec capability for a second hypothetical codec format BB. In such an instance, the source may decode the media and then recode the media into BB format before streaming the media to the client 404. This is but one example, which represents various levels of processing to the media which may occur at system components consistent with the concepts described above and below.

A geometry tracking component or geometry tracker 412, 444 can register and track any changes relating to a target window of the terminal services session. For example, geometry tracker 412 can register a unique identifier for a target window and track the target window on the remote desktop described above. The geometry tracker 412 can track changes relating to clipping of the target window by another window, position of the target window, and size of the target window at the server side. These changes are then relayed to the client 404 by the remote desktop protocols where the changes are directed to the client side multimedia module 446.

Geometry tracking may be a feature of a platform, such as Terminal Services® platform that provides a notification system for window geometry changes. Whenever a window's geometry changes, events containing the new geometry may be generated and sent to notification sinks at the source. In this example, the client acts as the source. Window geometry can change when a window is moved, minimized/maximized, or clipped by another window.

In certain cases, an application may decide to render media on the client instead of transmitting a pre-rendered bitmaps from the server. In order to do this, the application creates a window on both the server and client ends. The server window acts as a placeholder, and is able to accept all input, and the actual media may be rendered and painted by the application on the client end. The client window is painted right over the server window for the distribution to be transparent to the user. Since all input actually acts upon the server window, geometry changes will be reflected at the server. The application tracks these changes to the server window and updates the client window accordingly for both windows to be geometrically synchronized.

Exemplary Method(s)

Exemplary processes for collaboration sessions and handling media operations in collaboration sessions are described with reference to FIGS. 1-4. These processes may be described in the general context of computer executable instructions. Generally, computer executable instructions can include routines, programs, objects, components, data structures, procedures, modules, functions, and the like that perform particular functions or implement particular abstract data types. The processes may also be practiced in a distributed computing environment where functions are performed by remote processing devices that are linked through a communications network. In a distributed computing environment, computer executable instructions may be located in both local and remote computer storage media, including memory storage devices.

Figure 5:
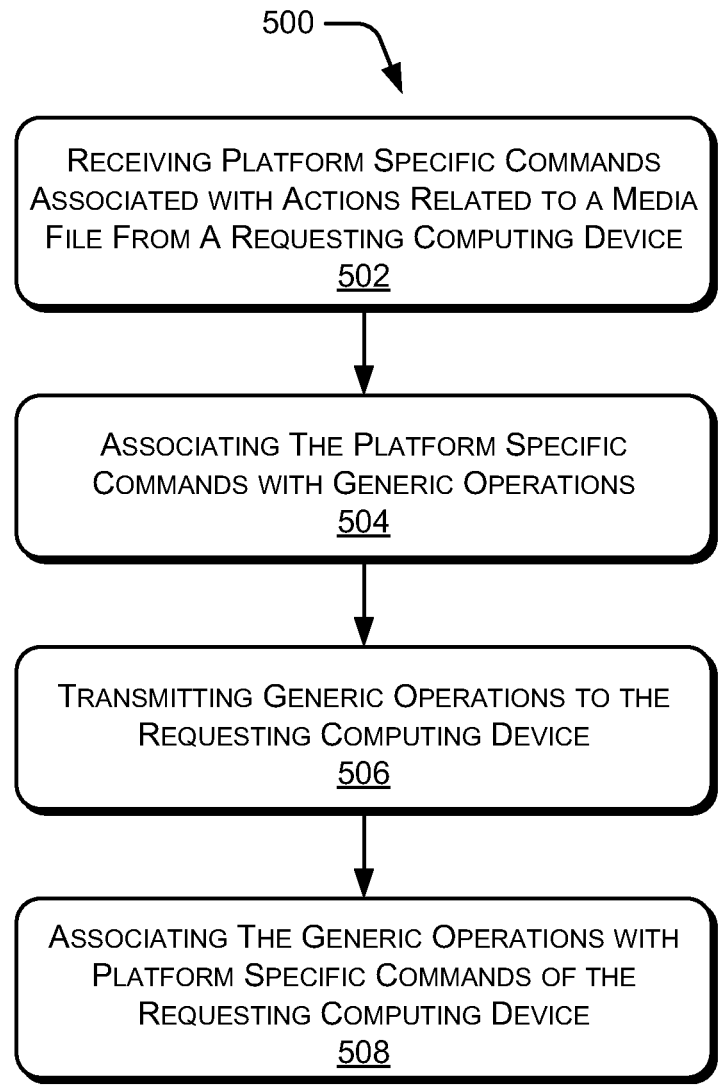
FIG. 5 is a flowchart illustrating an exemplary process for managing multimedia operations in a collaborative session.

FIG. 5 illustrates an exemplary method 500 for collaboration sessions and handling media playback operations in collaboration sessions. The order in which the method is described is not intended to be construed as a limitation, and any number of the described method blocks can be combined in any order to implement the method. Furthermore, the method can be implemented in any suitable hardware, software, firmware, or combination thereof.

At block 502, commands associated with one or more actions related to media files are received. The received commands are specific to the media platform associated with the computing device receiving the commands. The commands may be generated from another computing device that may be accessing the media files over a network. For example, the server's RTS media abstraction module 210 can receive media commands that are specific to the server's media platform 208. Such commands can be generated responsive to certain actions, such as the media file being accessed.

At block 504, the received platform specific commands are associated with one or more generic media operations. The generic operations may be common to a variety of applications for playing back of media files. In one implementation, the platform specific commands are associated with one or more generic operations based on a mapping. For example, the server's RTS media abstraction module 210 can utilize RTS mapping table 302 to map the received media operations (as indicated by commands 306A-306I) into generic or abstract media operations (as indicated by 308A-308I). An example of a platform based on the server 202 includes but is not limited to, Media Foundation.

At block 506, the generic operations are sent to the computing device requesting access to a media file. For example, the generic operations can be sent to the client 204 from the server 202. In one implementation, the server's RTS media abstraction module 210 sends the generic commands from the server 202 to the client 204.

At block 508, the generic commands are received by the requesting device and are associated with platform specific commands. For example, the client's RTS media abstraction module 214 receives the generic commands sent by the server's RTS media abstraction module 210. The client's RTS media abstraction module 214 can employ another RTS mapping table 304. The RTS mapping table 304 can translate the abstracted media operations into media operations that are specific to the client's media platform 212. The client's media platform 212 can then execute the media operations. Examples of media platform on the client 204 include but are not limited to the DShow® platform. Hence platform specific commands of the server 202 can be translated into platform specific commands of the client 204, through abstraction of the platform specific commands as generic operations.

An Exemplary Computing Environment

Figure 6:
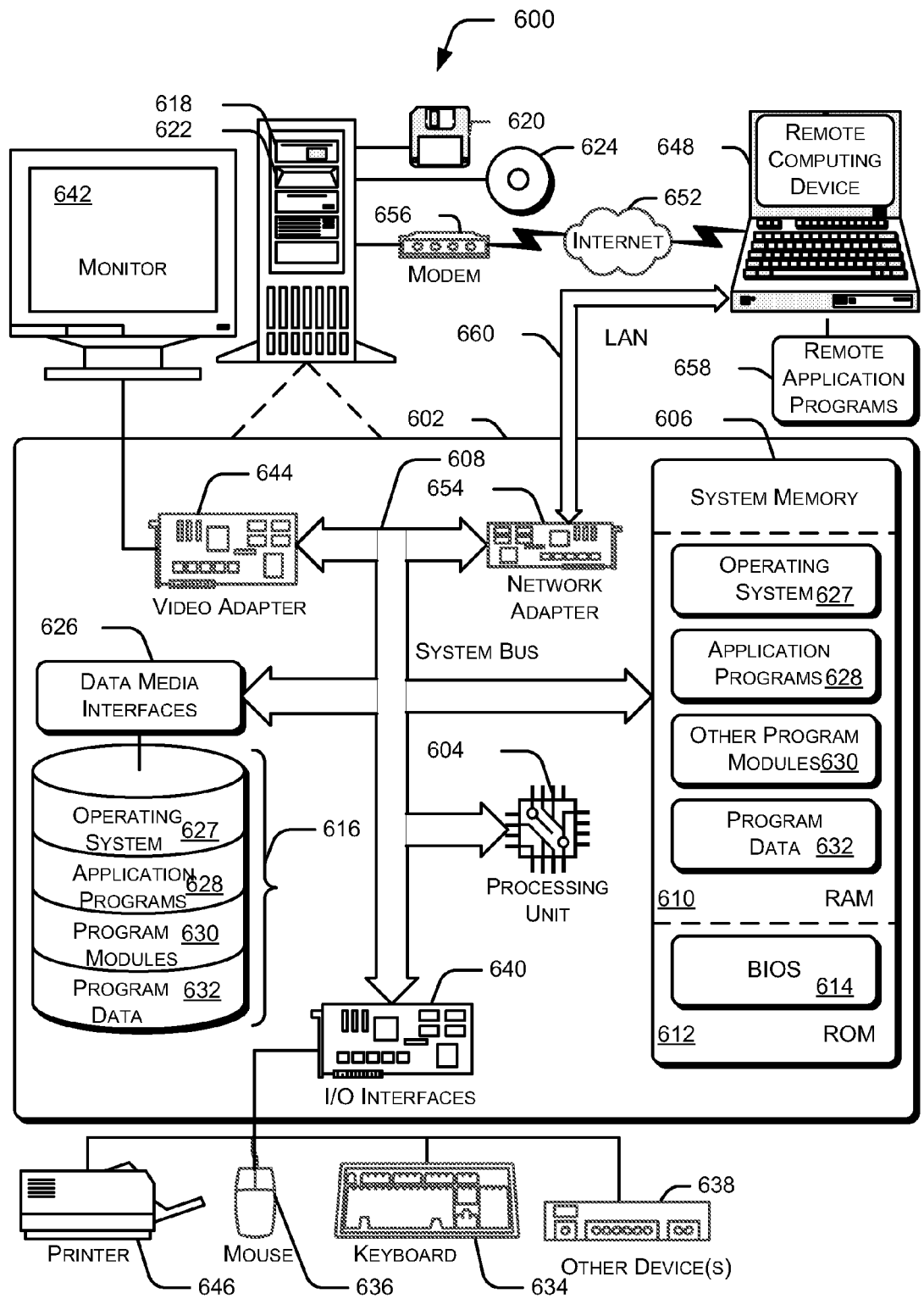
FIG. 6 is a block diagram illustrating an exemplary general computer environment.

FIG. 6 illustrates an exemplary general computer environment 600, which can be used to implement the techniques described herein, and which may be representative, in whole or in part, of elements described herein. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the example computer environment 600.

Computer environment 600 includes a general-purpose computing-based device in the form of a computer 602. Computer 602 can be, for example, a desktop computer, a handheld computer, a notebook or laptop computer, a server computer, a game console, and so on. The components of computer 602 can include, but are not limited to, one or more processors or processing units 604, a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

The system memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612 is illustrated. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown). Furthermore FIG. 6 illustrates a magnetic disk drive 618 for reading from and writing to a removable, non-volatile magnetic disk 620 (e.g., a "floppy disk"), additionally FIG. 6 illustrates an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternately, the hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646, which can be connected to computer 602 via the input/output interfaces 640.

Computer 602 can operate in a networked environment using logical connections to one or more remote computers, such as a remote computing-based device 648. By way of example, the remote computing-based device 648 can be a personal computer, portable computer, a server computer, a router, a network computer, a peer device or other common network node, and the like. The remote computing-based device 648 is illustrated as a portable computer that can include many or all of the elements and features described herein relative to computer 602.

Logical connections between computer 602 and the remote computer 648 are depicted as a local area network (LAN) 660 and a general wide area network (WAN) 652. Such networking environments are commonplace in offices, enterprise-wide computer networks, intranets, and the Internet.

When implemented in a LAN networking environment, the computer 602 is connected to a local network 660 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing-based device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments for managing multimedia operations in a collaborative session have been described in language specific to structural features and/or methods, it is to be understood that the subject of the appended claims is not necessarily limited to the specific features or methods described. Rather, the specific features and methods are disclosed as exemplary implementations for managing multimedia operations in a collaborative session.

What is claimed is:

1. A method executed on a computing device, comprising:
providing a collaboration session with a client having a client-side media platform specific to the client, the collaboration session including a first communication channel in which media data for a media component is communicated, and a second communication channel in which a user-interface component is communicated to the client;
receiving, from the client, server-side media-playback-commands of a server-side media platform specific to a server;
translating the server-side media-playback-commands of the server-side media platform specific to the server into platform generic media-playback-commands for transmission to a client; and
transmitting the platform generic media-playback-commands to the client, wherein the client translates the platform generic media-playback-commands into client-side media-playback-commands of the client-side media platform specific to the client.

2. A method as recited in claim 1 further comprising presenting a user interface at the client, in a media presentation window, and tracking changes to the media presentation window.

3. A method as recited in claim 2, wherein a media application is instantiated as the media presentation window on a user-interface component and wherein said tracking comprises assigning a unique identifier to the media presentation window and wherein changes to the media presentation window are relayed to the client to allow the media presentation window to be oriented relative to the user-interface component.

4. A method as recited in claim 1, wherein the second channel is established by the collaboration session.

5. A method as recited in claim 1, further comprising:
determining a format of the media;
evaluating a capacity of the client to decode and render the media in the format.

6. A method as recited in claim 5, in an event that the client lacks a capacity to decode and render the media in the existing format, further comprising decoding the media and re-encoding the media in a second different format which the client is configured to handle.

7. A method as recited in claim 1 further comprising:
establishing a virtual channel connection with the client,
negotiating formats which are supported by both a source of media communicated to the client and the client; and,
setting up a distributed topology with the client.

8. A method as recited in claim 7, wherein the setting-up a distributed topology comprises inserting a network transmitter at the source and a network receiver at the client.

9. A server comprising:
a user-interface-component that includes graphics and images that compose a user-interface, the user-interface-component in communication with a client via a first communication channel; and
a media component that includes media presentation data to be played through the user-interface-component, the media component configured to translate platform specific media-playback-commands of a first media platform supported by the server to platform generic media-playback-commands as a result of the client being unable to process the platform specific media-playback-commands for the first media platform or to platform specific media-playback-commands for a second media platform supported on a remote terminal session client, wherein the platform specific media-playback-commands of the first media platform are received from the client, and wherein the client translates generic media-playback-commands to platform specific media-playback-commands for the second media platform.

10. The server as recited in claim 9, wherein the user-interface component comprises a media application window.

11. The server as recited in claim 10, wherein the media component is configured to be presented in a media presentation target window within the media application window.

12. The server as recited in claim 11, wherein the media presentation data is tracked by tracking the media presentation target window relative to the media application window.

13. The server as recited in claim 12, wherein the tracking comprises relaying the relative position of the media presentation target window relative to the media application window to the remote client.

14. The server as recited in claim 12, wherein the tracking comprises inserting a placeholder on the server desktop which represents the media presentation target window and tracking any changes affecting the placeholder.

15. The server as recited in claim 9 wherein the media component is configured to determine what media formats are supported by the remote client.

16. The server as recited in claim 9 wherein the media component is configured to establish a distributed topology with the remote client.

17. The server as recited in claim 9 wherein the media component is configured to send and stream the media presentation data in a terminal services session.

18. A system, comprising:
a mechanism for providing a client that supports a first media player, a media component over a first communication channel and for providing a user-interface component over a second communication channel;
a mechanism for receiving, from the client, platform specific media-playback-commands for a second media player that is supported by a server and that are generated responsive to a user-input provided during a collaboration session; and a mechanism for determining whether the client is able to process platform specific media-playback-commands for the second media platform and translating the platform specific media-playback-commands for the second media platform into platform generic media-playback-commands as a result of the client being unable to process the platform specific media-playback-commands for the second media platform, wherein the client translates the platform generic media-playback-commands into platform specific media-playback-commands for the first media platform supported by the client.

19. A method as recited in claim 1, the translating the platform specific media-playback-commands into generic media-playback-commands for transmission to a client comprises:

employing a mapping table that maps the platform specific media-playback-commands into generic media-playback-commands.

* * * * *

UNITED STATES PATENT AND TRADEMARK OFFICE
CERTIFICATE OF CORRECTION

PATENT NO. : 8,433,812 B2
APPLICATION NO. : 12/060620
DATED : April 30, 2013
INVENTOR(S) : Mahajan et al.

It is certified that error appears in the above-identified patent and that said Letters Patent is hereby corrected as shown below:

In the Claims

On column 15, line 42, change "to a client" to --to the client--;

On column 15, line 53 and 54, change "on a user-interface" to --on the user-interface--;

On column 15, line 60 and 61, change "second channel" to --second communication channel--;

On column 15, line 63, change "the media" to --format of the media data--;

On column 15, line 65, change "media in the format" to --media data in the format--;

On column 15, line 67, change "lacks a capacity" to --lacks the capacity--;

On column 15, line 67 and column 16, line 1, change "the media in the existing format" to --the media data in the format--;

On column 16, line 1 and 2, change "media and re-encoding the media in a second different" to --media data and re-encoding the media data in a different--;

On column 16, line 6 and 7, change "both a source of media communicated to the client and the client" to --both the client and a source of media communicated to the client--;

On column 16, line 15, change "that compose a user-interface" to --that comprise a user-interface-component--;

On column 16, line 25, change "or to platform" to --or able to process platform--;

On column 16, line 30, change "translates generic" to --translates platform generic--;

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,433,812 B2

On column 16, line 31, change "to platform" to --to the platform--;

On column 16, line 33 and 34, change "the user-interface component comprises" to --the user-interface-component comprises--;

On column 16, line 42, change "relaying the relative" to --relaying a relative--;

On column 16, line 44, change "remote client" to --remote terminal session client--;

On column 16, line 46, change "the server" to --a server--;

On column 16, line 51, change "remote client" to --remote terminal session client--;

On column 16, line 54, change "remote client" to --remote terminal session client--;

On column 17, line 11, change "media platform supported" to --media player supported--; and On column 17, line 14 and 15, change "media-playback-commands for transmission to a client comprises:" to --media-playback-commands comprises:--.